Figure 1:
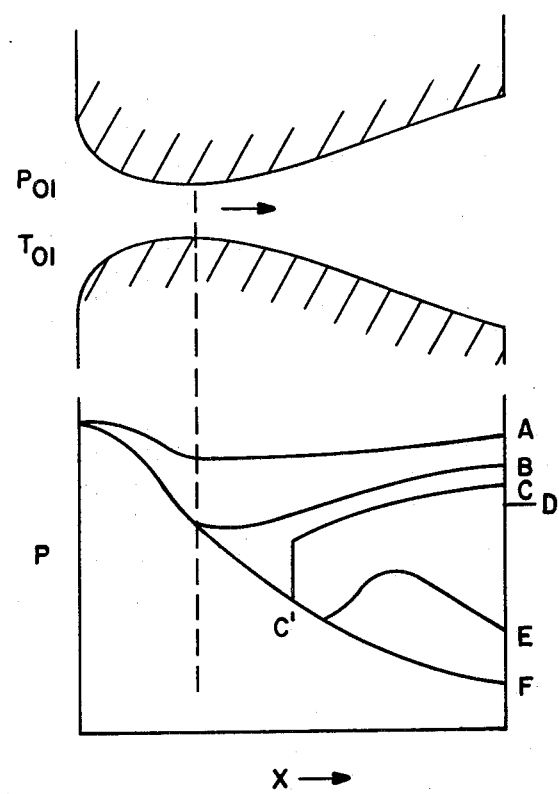
Figure 2:
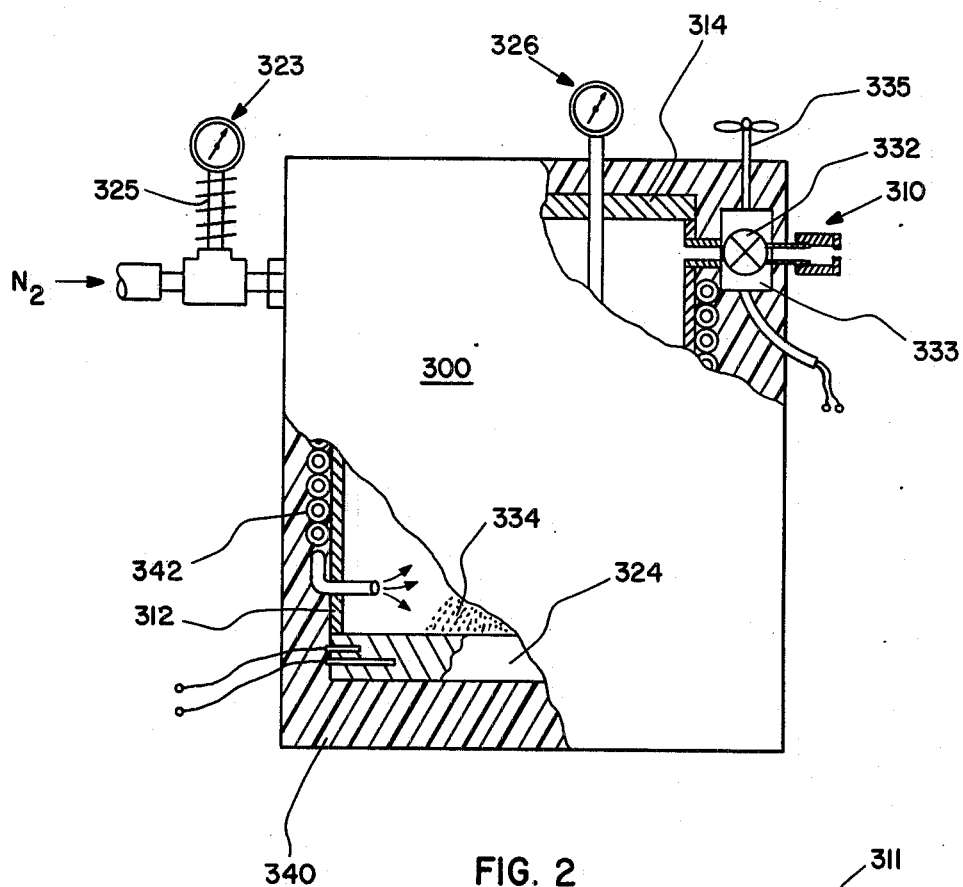

United States Patent [19]

Pouring

[11] 4,129,252
[45] Dec. 12, 1978

[54] METHOD AND APPARATUS FOR PRODUCTION OF SEEDING MATERIALS

[76] Inventor: Andrew A. Pouring, U.S. Naval Academy, Annapolis, Md. 21402

[21] Appl. No.: 580,372

[22] Filed: May 23, 1975

[51] Int. Cl.$^2$ .............................................. A01G 15/00
[52] U.S. Cl. .................................... 239/2 R; 239/14; 239/139
[58] Field of Search .............. 239/2 R, 14, 102, 132.1, 239/139; 252/359 A, 1, 314

[56] References Cited

U.S. PATENT DOCUMENTS

| | | | |
|---|---|---|---|
| 2,658,796 | 11/1953 | Kopperschmidt | 239/132.1 X |
| 3,126,155 | 3/1964 | Lohse | 252/359 |
| 3,313,490 | 4/1967 | Loveland | 239/596 |
| 3,545,677 | 12/1970 | Power et al. | 239/2 R |
| 3,554,443 | 1/1971 | Hughes | 239/102 X |
| 3,788,543 | 1/1974 | Amand et al. | 239/2 R |
| 3,899,129 | 8/1975 | Fukuta et al. | 239/14 |

*Primary Examiner*—Joseph F. Peters, Jr.
*Assistant Examiner*—Michael Mar
*Attorney, Agent, or Firm*—R. S. Sciascia; Roy Miller; Donald Mollick

[57] ABSTRACT

A method and apparatus is provided for production of ice nuclei by generation of homogenous nuclei in nozzle or orifice expansions. The homogeneous nuclei are formed in the rapid cooling of vapors by rapid expansion through a supersonic nozzle or an orifice. These nuclei then serve as seeding materials for formation of ice.

A preferred method of carrying out the invention includes heating a volatile compound in a closed chamber to form a vapor, pressurizing the chamber with nitrogen gas and controllably releasing the resulting nitrogen gas-vapor combination through a nozzle or orifice in supersonic flow.

5 Claims, 5 Drawing Figures

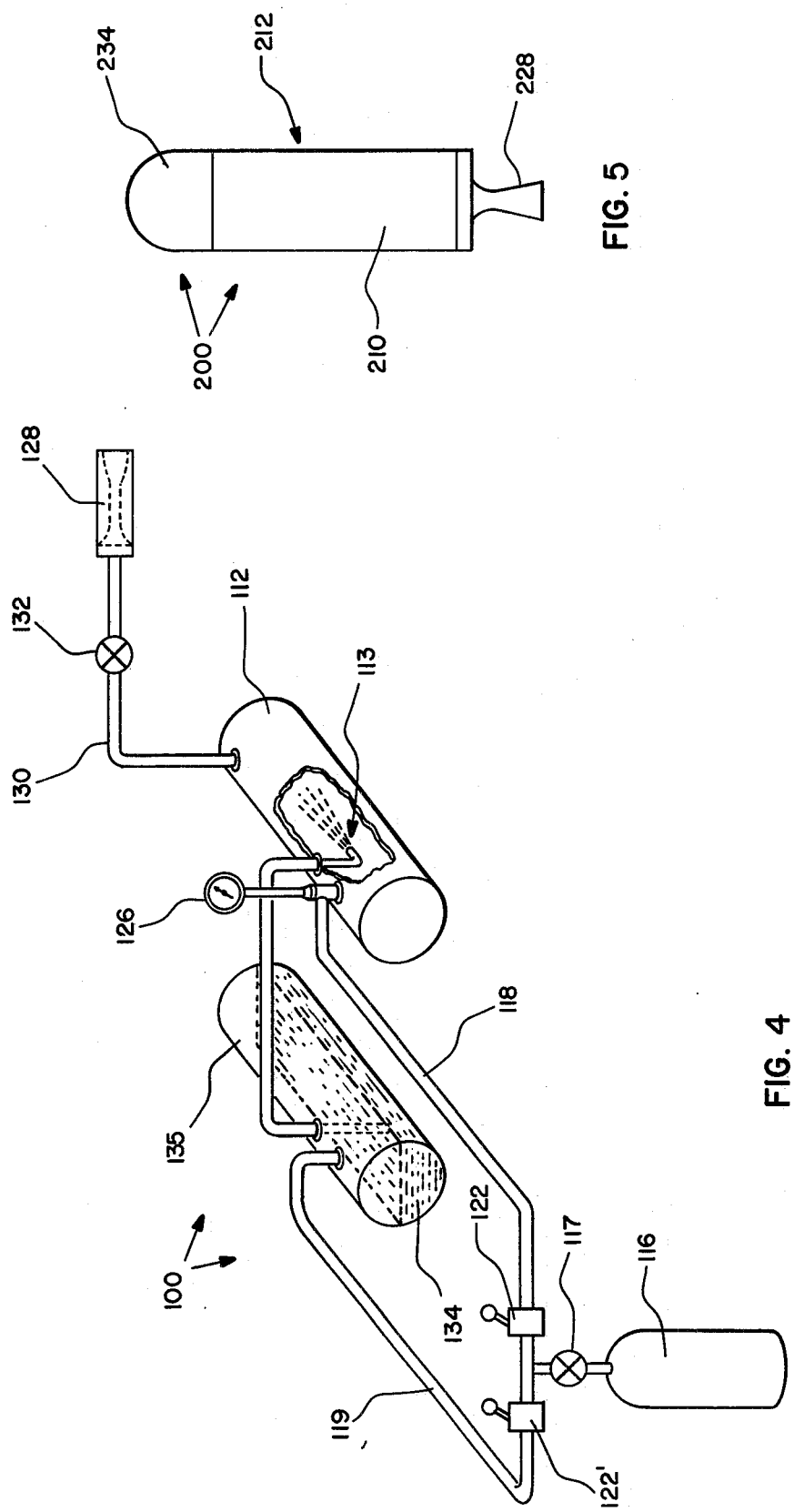

METHOD AND APPARATUS FOR PRODUCTION OF SEEDING MATERIALS

GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a method and apparatus for the production of particulate matter of such nature and size and at such conditions of temperature and pressure as to either inhibit or stimulate precipitation in the atmosphere.

More particularly the present invention relates to a method and apparatus for the production of monodispersed aerosols of chemical materials effective as ice nuclei.

In the recent past a number of investigators, including applicant, have published articles which are considered pertinent to the field of the invention. Some of these are:

P. P. Wegener and A. A. Pouring, "Experiments on Condensation of Water Vapor by Homogeneous Nucleation in Nozzles," Physics of Fluids, Vol. 7, 1964, pp. 352-367.

E. R. Buckle and A. A. Pouring, "Effects of Seeding on the Condensation of Atmospheric Moisture in Nozzles," Nature, Vol. 208, No. 5008, pp. 367-369.

A. A. Pouring, "Thermal Choking and Condensation in Nozzles," Physics of Fluids, Vol. 8, No. 10, 1965, pp. 1802-1810.

A. A. Pouring, "Effects of Heterogeneous Nucleation of Water Vapor in Nozzles," Basic Engineering, December 1970, pp. 689-694.

N. Fukuta, "Advances in Organic Ice Nuclei Generator Technology," Proc. Internat. Conf. on Weather Modification, Canberra, Australia, 6–11 September, 1971, pp. 343-348.

N. Fukuta, "Advances in Organic Ice Nuclei Generator Technology," J. Rech. Atmos, "Desseus Memorial Issue," No. 1-2-3.

Paik, Y. N. Fukuta, and C. J. Todd, "A new Method of Generating Ice Nuclei Smoke Particles for Weather Modification," Proc. Third Conf. on Weather Modification, Rapid City, S. D., 25-29 June, 1972, pp. 30-32.

A. A. Pouring and E. R. Buckle, "The Kinetics of Evolution of Water Vapor Clusters in Air," U.S. Naval Academy E & W Report #3-74, December 1974 (in press).

Figure 3:
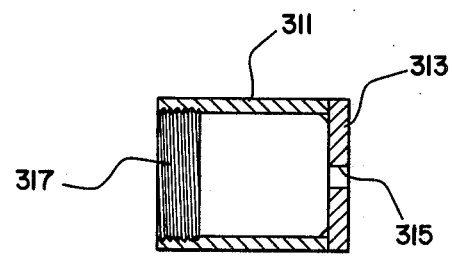

"Investigation of Small Particles Produced by Gas-Dynamic Expansion of Vapor-Gas Mixtures," May 1974 (Senior Thesis), Midshipman 1/C Michael W. Moran, USN, advisor: A. A. Pouring.

According to the present invention supersonic flow phenomena in a converging-diverging nozzle or even a simple orifice with slightly supersonic flow are shown to be effective for production of ice nuclei, for example, for cloud seeding.

BRIEF DESCRIPTION OF THE SEVERAL VIEWS OF THE DRAWING

FIG. 1 is a schematic cross-sectional view of a converging-diverging nozzle with typical flow paths superimposed thereon;

FIG. 2 is a side elevational view partly in section of apparatus for carrying out the invention;

FIG. 3 is an enlarged detail view of the orifice of FIG. 2;

FIG. 4 is a schematic diagram of a second embodiment of apparatus for carrying out the invention; and FIG. 5 is a plan view of a third embodiment of apparatus for carrying out the invention.

DESCRIPTION AND OPERATION

The general behavior of flow in a converging-diverging nozzle is given in FIG. 1. Considering fixed inlet pressure $P_{01}$ and temperature $T_{01}$, the flow will follow paths A-F depending on the pressure ratio across the nozzle;

A — Bernouilli flow.

B — Bernouilli flow.

C — Expansion to C′, shock and diffuser pressure rise C′ to C.

D — Expansion to F with shock pressure rise to D.

E — Expansion with condensation and shock.

F — Expansion to F, no shocks or condensation.

The flow at E, F is supersonic while that about D is subsonic. The flow at F will diffuse externally and the temperature will rise in the process as the flow kinetic energy (and flow work) are reconverted into internal energy. (Under ideal conditions with no mixing, the temperature would return to the initial temperature.)

In using nozzles for ice nuclei or seed generators the general behavior of FIG. 1 must be kept in mind.

The type expansion most desirable for production of seeding material by homogeneous nucleation is that following pressure distributions between the limits of curves E and F in FIG. 1. The experiments described in the published articles by Wegener and Pouring, Buckle and Pouring and Pouring amply demonstrate homogeneous nucleation in nozzles.

Application of this principle to the production of seeding materials in supersonic nozzles was successfully demonstrated by Applicant at the Naval Weapons Center, China Lake, CAlifornia with a device similar to that in FIG. 2 except that a supersonic nozzle replaced the orifice 310.

More recent experiments demonstrate that the expansion in a simple orifice is also effective for producing seeding materials.

The apparatus shown in FIG. 2, and indicated generally by the numeral 300, makes use of a simple orifice member 310 in place of a nozzle outlet. The seeder apparatus includes a container vessel 312 closed by a top member 314 and contains a chemical substance 334. A heater 324 is used to heat the chemical and a thermometer 326 is shown communicating with the chamber to aid in control of the process.

In this embodiment the container 312 is wholly surrounded by insulation 340 and the pressurization gas is supplied through a heat exchanger coil 342 in contact with the vertical walls of the heated container 312. Vapor laden gas is exhausted as desired through valve 332 which is preferably enclosed in a temperature control jacket 333 and fitted with a control member 335 passing through the insulation 340.

The pressurization gas may be any readily available inert gas and is conveniently shown as $N_2$. The gas is supplied through a conventional pressure regulator valve arrangement and a pressure gauge 323 may be placed in the line near the container to aid in control of the process. The supply line to gauge 323 is shown fitted with cooling fins 325 to attenuate the temperature of gases reaching the gauge.

The orifice member 310 is best revealed in FIG. 3 which shows, for example, a simple fitting of ordinary pipe with a piece of shim stock (on the order of 0.030 inch thick) 313 welded across one end. A single hole 315 in the shim stock provides the orifice and the pipe fitting has internal threads 317 at the opposite end for attachment.

Vapors of the chemical material when carried by the gas through the orifice at transonic speed will, under proper circumstances undergo the same expansion and condensation phenomena as described above for convergent divergent nozzles.

The operating procedure is to place a chemical compound in the chamber and when the sample melts and vaporizes, the pressure and temperature are adjusted and the exit valve is opened for a predetermined time.

The tests to date were conducted with the organic compounds under the conditions listed in the following Table. A one second (approx.) blast of the nozzle was directed into a cold fog chamber. It should be noted that the compounds used were those investigated by Aaron Fletcher (High-Temperature Contact Nucleation of Supercooled Water by Organic Chemicals); applicant decided to investigate their effectiveness when cooled suddenly or "quenched" from the vapor phase in accordance with the present invention.

| EXP. | Sample[1] | Temp[2] °C | Pressure[2] Psig | Fog Temp °C | Yield[3] |
|---|---|---|---|---|---|
| 001 | Metaldehyde (MA) | 98–93 | 28 | −10 | $2 \times 10^7$ |
| 002 | Quinoxaline | 56–50 | 28 | −9 | Nil[4] |
| 003 | MA in H$_2$O | 129–121 | 28 | −11 | $9 \times 10^8$ |
| 004 | Distilled H$_2$O | 148–129 | 28 | −11 | $10^5$ |
| 005 | MA | 129–121 | 28 | −11.5 | $6 \times 10^7$ |
| 006 | Quinoxaline in H$_2$O | 87–76 | 28 | −11 | $10^6$ |
| 008 | Phenazine | 71–65 | 40 | −9 | $7 \times 10^8$ |
| 009 | Phenazine | 71–65 | 40 | −11 | (5) |
| 010 | Phenazine | 71–65 | 40 | −8 | (6) |

[1] about ½ gram
[2] in seeder
[3] total number of ice crystals produced in 24m$^3$ cold box.
[4] repeated with longer blast giving a few crystals.
[5] overseeded, ice fog resulted
[6] barely countable When quinoxaline was found to be ineffective, it was also tested by producing a smoke of quinoxaline from the tip of a soldering iron. It too was ineffective. The compound 2-4D diaminotoluene was tried and found ineffective. Phenazine smoke, on the other hand, proved quite effective.

Several conclusions can be drawn at this point. First the quenching of organic vapors or other vapors in a carrier gas is an effective method of ice nuclei production. Expansion of the organic, in steam, as by Fukuta may have an enhancing effect. A rapid method of testing organics or seeding agents is by forming smokes.

It should be noted that expansion of water vapor alone from initial temperatures near 0° C. to exit temperatures below 0° C. should produce the largest number of small ice nuclei or seed.

A second variation whereby fine sprays can be quenched in a nozzel (or orifice) equally well as producing homogeneous nuclei in the nozzle is now described.

The generator shown in FIG. 4 is pressurized with nitrogen to a pressure giving complete expansion in the nozzle. The operating pressure may be selected empirically by observing the nozzle exit in a shadowgraph and noting the pressure that gives the most shock free external flow. This pressure, of course, will vary with the nozzle used.

The quenching apparatus generally indicated at 100 in FIG. 4 uses a supersonic nozzle as indicated at 128. A fine spray is produced in chamber 112 of water or any other solution (134) being investigated which is supplied under pressure from tank 135. The resultant vapors are quenched on passage through the supersonic nozzle 128 under control of valve 132.

Spray can be produced in a variety of ways, the one demonstrated in this apparatus is with a 1 gal/min. spray nozzle 113, pressurized to 120 psig by N$_2$, for example, from tank 116 through pipes 118, 119, regulators 122, 122' and valve 117. The nozzle characteristic shows the largest number of droplets produced in the 1–10µ category while the largest mass is concentrated in larger sizes. Since the flow must take a 90° turn at the entrance to pipe 130 going to the supersonic nozzle, only the smallest drops are carried out of container, vessel or tank 112.

Examination of the outlet flow impinging on a stainless steel sheet shows an extremely fine haze forming and gradually running off as very fine droplets. If the initial temperature approaches 0° C., the surviving droplets in the exhaust will probably be frozen.

Heat is applied to tank 112 by conventional means (not shown) and the temperature regulated therein by reference to temperature guage 126.

This gives, therefore, a means of producing in one device, particles nucleated homogenously and as small as $10^{-7}$cm or $10^{-3}$µ. These are obtained by leaving water in the bottom of chamber (b) and passing N$_2$ through. The temperature should be near 0° C. For larger sizes, the spray is used.

With such a device it is possible under proper circumstances to produce "seed" of one size to prevent precipitation, under certain other conditions producing other "seed" to force precipitation. Also, using water "seed" would cause no pollution of the environment and leave no trace of its presence.

A third application of quenching seed in supersonic nozzles is indicated generally at 200 in FIG. 5. This is simply a small solid propellant rocket 212 having a supersonic propulsion nozzle 228 with propellant 210 sufficient to launch to altitude and pyrotechnic seed material 234 which is dispensed at altitude.

These experiments may be extended to other agents, including AgI for references for various expansions, in higher Mach number nozzles and for various seeder temperatures. For example, the optimum seeder temperature for a specific agent is first determined, then the variation with different Mach number nozzles from the optimum initial temperature. Beginning with AgI gives a useful reference. The variation of nozzle initial pressure on the production rate from the optimum initial temperature may then be investigated.

What is claimed is:

1. A method of generating ice nuclei comprising the steps of:
   heating a vaporizable chemical compound in a closed insulated chamber to a point of vaporization;
   pressurizing said chamber with an inert pressurization gas consisting essentially of N$_2$; and
   controllably releasing the resulting gaseous mixture from said chamber through a hole in a thin metal sheet at supersonic flow into a moist atmosphere.

2. The method of claim 1 wherein said chemical material is an organic compound selected from the group consisting of distilled H$_2$O, Metaldehyde, Metaldehyde in H$_2$O, phenazine and Quinoxaline in H$_2$O.

3. The method of claim 2 wherein the release of said gaseous mixture is controlled to give the most shock free external flow.

4. Apparatus for production of ice nuclei comprising:
an enclosed chamber;
heat exchanger means surrounding said enclosed chamber to receive heat therefrom and connecting said enclosed chamber to a source of nitrogen gas for pressurizing said chamber;
means in said chamber for vaporizing a substance therein;
means for controlling gas flow from said enclosed chamber including an orfice punched in a relatively thin metal sheet; and
valve means associated with said orfice for releasing gas through said orfice into the atmosphere.

5. The apparatus of claim 4 wherein said means for vaporizing include a spray nozzle.